United States Patent
Li et al.

(10) Patent No.: US 12,149,582 B2
(45) Date of Patent: Nov. 19, 2024

(54) DYNAMIC ALLOCATION OF PLATFORM-INDEPENDENT MACHINE LEARNING STATE MACHINES BETWEEN EDGE-BASED AND CLOUD-BASED COMPUTING RESOURCES

(71) Applicant: Deere & Company, Moline, IL (US)

(72) Inventors: Yueqi Li, San Jose, CA (US); Alexander Ngai, Irvine, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/540,015

(22) Filed: Dec. 1, 2021

(65) Prior Publication Data

US 2023/0171303 A1 Jun. 1, 2023

(51) Int. Cl.
G06F 15/16 (2006.01)
G06F 9/48 (2006.01)
(Continued)

(52) U.S. Cl.
CPC ............ H04L 67/10 (2013.01); G06F 9/4806 (2013.01); G06F 9/4881 (2013.01);
(Continued)

(58) Field of Classification Search
CPC ....... H04L 67/10; H04L 67/12; G06F 9/4806; G06F 9/4881; G06F 9/5027; G06Q 50/02
See application file for complete search history.

(56) References Cited

U.S. PATENT DOCUMENTS 10,470,379 B1 * 11/2019 Dong .................... G06T 7/0016
10,638,667 B2 * 5/2020 Regan ..................... G09B 5/06
(Continued)

FOREIGN PATENT DOCUMENTS

| CA | 2951723 C | * | 4/2021 | ............... C12Q 1/04 |
| CN | 110262476 A | * | 9/2019 | |
| WO | WO-2018042445 A1 | * | 3/2018 | ........... A01B 79/005 |

OTHER PUBLICATIONS

Ding et al., "Dynamic Task Allocation for Cost-Efficient Edge Cloud Computing" 2020 IEEE International Conference on Services Computing (SCC). 8 pages. DOI 10.1109/SCC49832.2020.00036.

(Continued)

*Primary Examiner* — Ario Etienne
*Assistant Examiner* — Thorne E Waugh
(74) *Attorney, Agent, or Firm* — Hanley, Flight & Zimmerman, LLC

(57) ABSTRACT

Implementations are disclosed for dynamically allocating aspects of platform-independent machine-learning based agricultural state machines among edge and cloud computing resources. In various implementations, a GUI may include a working canvas on which graphical elements corresponding to platform-independent logical routines are manipulable to define a platform-independent agricultural state machine. Some of the platform-independent logical routines may include logical operations that process agricultural data using phenotyping machine learning model(s). Edge computing resource(s) available to a user for which the agricultural state machine is to be implemented may be identified. Constraint(s) imposed by the user on implementation of the agricultural state machine may be ascertained. Based on the edge computing resource(s) and constraint(s), logical operations of some platform-independent logical routines may be dynamically allocated to the edge computing resource(s), and logical operations of other platform-independent logical routines may be dynamically allocated to a cloud computing resource.

17 Claims, 6 Drawing Sheets

(51) Int. Cl.
*G06F 9/50* (2006.01)
*G06Q 50/02* (2012.01)
*H04L 67/10* (2022.01)
*H04L 67/12* (2022.01)

(52) U.S. Cl.
CPC .......... *G06F 9/5027* (2013.01); *G06Q 50/02* (2013.01); *H04L 67/12* (2013.01)

(56) References Cited

U.S. PATENT DOCUMENTS

| | | | | |
|---|---|---|---|---|
| 10,951,738 | B1* | 3/2021 | Selegean | G06F 9/547 |
| 11,257,172 | B2* | 2/2022 | Bender | G06Q 50/02 |
| 11,382,260 | B2* | 7/2022 | Tewari | A01C 14/00 |
| 11,425,852 | B2* | 8/2022 | Sibley | G06V 20/188 |
| 2007/0031028 | A1* | 2/2007 | Vetter | G06V 40/169 |
| | | | | 382/154 |
| 2016/0247194 | A1* | 8/2016 | Morishita | H04L 67/10 |
| 2016/0253595 | A1* | 9/2016 | Mathur | G06F 30/00 |
| | | | | 706/12 |
| 2016/0308954 | A1* | 10/2016 | Wilbur | H04L 67/52 |
| 2018/0121226 | A1* | 5/2018 | Liu | G06F 11/3419 |
| 2018/0204292 | A1* | 7/2018 | Akadiri | G06Q 10/0635 |
| 2019/0124855 | A1* | 5/2019 | Rowan | G06Q 50/02 |
| 2019/0324436 | A1* | 10/2019 | Cella | H04L 1/18 |
| 2020/0090107 | A1* | 3/2020 | Mckeeman | G06Q 10/063112 |
| 2020/0401883 | A1* | 12/2020 | Yang | G06N 3/08 |
| 2021/0073540 | A1* | 3/2021 | Tran | G06Q 50/02 |
| 2021/0144911 | A1* | 5/2021 | Plattner | G06Q 50/02 |
| 2022/0117215 | A1* | 4/2022 | Sibley | A01M 21/00 |
| 2022/0142038 | A1* | 5/2022 | Amagai | G06T 7/0004 |
| 2022/0183208 | A1* | 6/2022 | Sibley | G05D 1/0246 |
| 2022/0276953 | A1* | 9/2022 | Padala | G06F 11/3433 |
| 2023/0059741 | A1* | 2/2023 | Li | G06N 3/0464 |
| 2023/0102495 | A1* | 3/2023 | Yuan | G06F 9/5094 |
| | | | | 718/104 |
| 2023/0139567 | A1* | 5/2023 | Jia | G16B 40/20 |
| | | | | 706/25 |
| 2023/0222531 | A1* | 7/2023 | Cella | G06Q 10/06375 |
| | | | | 705/7.31 |

OTHER PUBLICATIONS

Mu et al., "Computation offloading to edge cloud and dynamically resource-sharing collaborators in Internet of Things" Wireless Com Network. 2020. https://doi.org/10.1186/s13638-020-01865-4. 21 pages.

Hamdan et al., "Edge-Computing Architectures for Internet of Things Applications: A Survey" Sensors 2020, 20, 6441; doi:10.3390/s20226441. 52 pages.

Li et al., "Energy Efficient Resource Management and Task Scheduling for IoT Services in Edge Computing Paradigm" 2017 IEEE International Symposium on Parallel and Distributed Processing with Applications and 2017 IEEE International Conference on Ubiquitous Computing and Communications. 6 pages.

Dechouniotis et al., "Edge Computing Resource Allocation for Dynamic Networks: The DRUID-NET Vision and Perspective" Sensors 2020, 20, 2191; doi:10.3390/s20082191. 18 pages.

Zhai et al., "IoT-RECSM-Resource-Constrained Smart Service Migration Framework for IoT Edge Computing Environment" Sensors 2020, 20, 2294; doi:10.3390/s20082294. 15 pages.

Ferrandez-Pastor et al., "Precision Agriculture Design Method Using a Distributed Computing Architecture on Internet of Things Context" Sensors 2018, 18, 1731; doi:103390/s18061731. 21 pages.

* cited by examiner

DYNAMIC ALLOCATION OF PLATFORM-INDEPENDENT MACHINE LEARNING STATE MACHINES BETWEEN EDGE-BASED AND CLOUD-BASED COMPUTING RESOURCES

BACKGROUND

Designing and implementing complex, machine learning-based data processing pipelines typically requires a significant amount of engineering effort, as well as expertise in data science and computer programming. These requirements raise significant barriers to entry in industries where such expertise is uncommon, such as in the agricultural industry where growers may still rely on human-based phenotyping of their crops. However, with the rise of precision agriculture—enabled at least in part by increased capability, availability, and affordability of agricultural robots, unmanned aerial vehicles (UAVs), and modular sensor packages—machine learning-based phenotyping has become increasingly crucial to remain competitive.

SUMMARY

Implementations are described herein for dynamically allocating aspects of platform-independent machine-learning based state machines among edge computing resources and cloud computing resources. More particularly, but not exclusively, implementations are described herein for providing an intuitive graphical user interface (GUI) that allows users, such as growers or employees of growers, to visually design and implement a platform-independent agricultural state machine that includes at least some aspect of machine learning-based phenotyping. Computational aspects of such a platform-independent agricultural state machine may then be dynamically allocated between edge-based and cloud-based computing resources available to a grower based on a variety of factors. These factors may include, but are not limited to, capabilities of the edge computing resources, constraints imposed by the grower on implementation of the agricultural machine, conditions encountered in the field (e.g., plant health, disease, pest infestation), and so forth. Notably, the grower need not be involved with, or even have significant understanding of, the processes of designing and/or dynamically allocating aspects of the agricultural state machine in this manner. Instead, the high-level and intuitive design of the agricultural state machine may be abstracted from such implementation details.

In some implementations, a method may be implemented using one or more processors and may include: causing one or more graphical user interfaces (GUIs) to be rendered on a display, wherein each GUI of the one or more GUIs includes a working canvas on which a plurality of graphical elements corresponding to a plurality of platform-independent logical routines are manipulable to define a platform-independent agricultural state machine, and wherein one or more of the platform-independent logical routines includes logical operations that process agricultural data that represents one or more plants using one or more phenotyping machine learning models; identifying one or more edge computing resources available to a grower for which the agricultural state machine is to be implemented; determining one or more constraints imposed by the grower on implementation of the agricultural state machine; and based on the one or more edge computing resources and the one or more constraints, implementing the agricultural state machine. In some implementations, implementing the state machine may include: dynamically allocating, to one or more of the edge computing resources, logical operations of one or more of the platform-independent logical routines of the agricultural state machine; and dynamically allocating, to a cloud computing resource in network communication with the one or more edge computing resources, logical operations of one or more other platform-independent logical routines of the agricultural state machine.

In various implementations, the one or more constraints may include a desired measure of accuracy. In various implementations, the one or more constraints may include one or more latency thresholds. In various implementations, the implementation may include causing one or more of the edge computing resources to execute at least some platform-independent logical operations of each of the plurality of platform-independent logical routines of the agricultural state machine.

In various implementations, the logical operations of one or more of the platform-independent logical routines may be dynamically allocated to one or more of the edge computing resources in response to detection of a phenotypic trait of one or more of the plants. In various implementations, the logical operations of one or more of the platform-independent logical routines may be dynamically allocated to one or more of the edge computing resources in response to detection of a plant disease or pest affecting one or more of the plants.

In various implementations, logical operations of a given platform-independent logical routine may be dynamically allocated to a given edge computing resource using a set of platform-dependent parameters tailored specifically to the given edge computing resource, wherein a plurality of sets of distinct platform-dependent parameters map the given platform-independent logical routine to a plurality of different edge computing resources. In various implementations, the set of platform-dependent parameters may include one or more of: a programming language supported by the given edge computing resource; a processor architecture of the given edge computing resource; or a number of processing cores available on the given edge computing resource.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
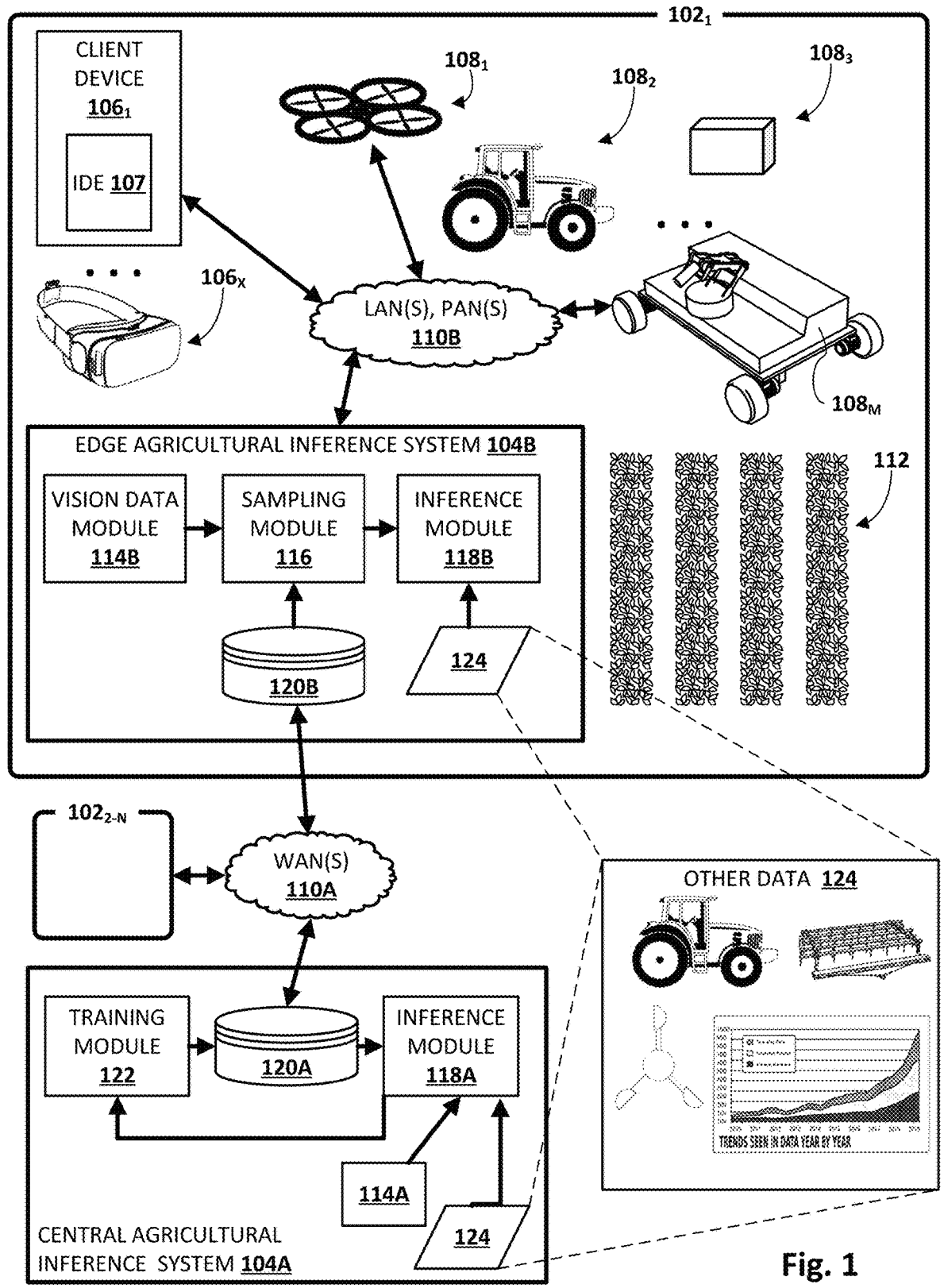
FIG. 1 schematically depicts an example environment in which disclosed techniques may be employed in accordance with various implementations.

Implementations are described herein for dynamically allocating aspects of platform-independent machine-learning based state machines among edge computing resources and cloud computing resources. More particularly, but not exclusively, implementations are described herein for providing an intuitive graphical user interface (GUI) that allows growers to visually design and implement a platform-independent agricultural state machine that includes at least some aspect of machine learning-based phenotyping. Computational aspects of such a platform-independent agricultural state machine may then be dynamically allocated between edge-based and cloud-based computing resources available to a grower based on a variety of factors. These factors may include, but are not limited to, capabilities of the edge computing resources, constraints imposed by the grower on implementation of the agricultural machine, conditions encountered in the field (e.g., plant health, disease, pest infestation), and so forth. Notably, the grower need not be involved with, or even have significant understanding of, the processes of designing and/or dynamically allocating aspects of the agricultural state machine in this manner. Instead, the high-level and intuitive design of the agricultural state machine may be abstracted from such implementation details.

A platform-independent state machine designed, configured with, and/or implemented in accordance with selected aspects of the present disclosure may include a plurality of platform-independent logical routines that are represented by a plurality of graphical elements. Each graphical element may correspond to a logical routine that is intuitively understandable by agricultural personnel, such as "fruit counter," "crop yield predictor," and so forth. Each platform-independent logical routine may include various logical operations (e.g., lines/blocks of code, functions, etc.) that may or may not be separable from each other (e.g., extractable from the logical routine). In some implementations, the graphical elements may be rendered as nodes that can be connected with edges that logically couple the logical routines underlying the nodes. For example, output of a first node may be provided as an input to a second node based on an edge that runs from the first node to the second node. In various implementations, the nodes and edges may be manipulable relative to each other, e.g., by dragging and dropping, resizing, moving, etc., to allow the user to make changes to the agricultural state machine.

In various implementations, a GUI configured with selected aspects of the present disclosure may include a working canvas on which users are able to manipulate the aforementioned graphical elements to define an agricultural state machine. In some implementations, the user-defined arrangement of graphical elements may be used to generate source code that includes one or more machine learning operations. In some implementations, this source code may be written in a programming language like C or C++, and may be compiled into an executable computer program tailored for a specific computing architecture. In other implementations in which the source code is a higher level scripting language, the source code may be interpreted (which may involve just-in-time compilation). In yet other implementations, the source code may be written in a language such as Java, and may be compiled into bytecode that is relatively platform-independent, and therefore, readily allocated to the edge or to the cloud.

As noted previously, a variety of factors may be considered when dynamically allocating aspects of platform-independent agricultural state machines between edge-based and cloud-based computing resources. Edge computing resources that are available to the grower for which the agricultural state machine is to be implemented are a primary example. The greater the capabilities of the grower's edge computing resources, the more logical operations of platform-independent logical routines can be allocated to those edge computing resources, instead of to cloud-based resources. And vice versa.

Constraint(s) imposed on implementation of the platform-independent agricultural state machine, e.g., by the grower, may also be considered for dynamic allocation between edge-based and cloud-based computing resources. These constraints may include, for instance, a desired or required measure of accuracy, one or more latency thresholds, a minimum or maximum sample size for generating a phenotypic inference, and so forth.

A desired or required measure of accuracy may dictate how accurate phenotypic inferences must/should be for the grower's purposes. For example, if a grower is able to quickly corroborate or refute any potentially detected disease via manual inspection, the grower may be willing to accept relatively low accuracy and/or false positive disease detection as a tradeoff for early warnings. As another example, growers of everbearing crops like strawberries may be willing to accept rough estimates of crop yields so long as those estimates are provided in near real time, which may allow the grower to hire appropriate labor and/or make competitive bids to distributors. As yet another example, in use cases where accurate localization of individual plants is less crucial (e.g., field-wide crop yield estimation), localization may be allocated to edge-based computing resources.

Latency thresholds may dictate how much time a grower is willing or able to wait for output to be generated by the agricultural state machine. Some phenotypic inferences, such as the aforementioned disease detection, may be more urgent than others, and therefore may be assigned lower latency thresholds. The lower the latency threshold, the more likely various aspects of the agricultural state machine will be allocated to edge-based computing resources, and vice versa.

In various implementations, latency thresholds and desired measures of accuracy may be considered and/or altered in tandem. For example, a grower that imposes a relatively low desired measure of accuracy may be able to impose relatively short latency thresholds because the grower's edge-based computing resources may be capable of generating rough phenotypic inferences quickly. Conversely, a grower that imposes a relatively high measure of accuracy may not be able to impose short latency thresholds, especially if the grower's edge-based computing resources are lacking in capabilities or processing power. In some implementations, when a grower attempts to impose desired measures of accuracy and/or latency thresholds that are not achievable concurrently, a warning may be output to the grower, or a recommendation to increase edge-based computing capabilities may be provided.

In some implementations, the grower may be presented with a GUI that includes sliders or other adjustable elements that the grower can manipulate to adjust these parameters. Limits and/or values of these adjustable elements may be selected and/or dynamically altered based on current values of other parameters. Suppose the grower operates a first slider associated with a desired measure of accuracy to a relatively high value, meaning the grower desires relatively accurate phenotypic inferences. Another slider that is adjustable to impose a latency threshold may be altered, e.g., to increase a minimum allowed latency threshold and account for the fact that lower latency thresholds are no longer achievable given the relatively high accuracy desired by the grower.

In various implementations, a platform-independent agricultural machine may be reusable (e.g., portable) across disparate distributed computing systems, e.g., associated with different growers. In some implementations, for example, at least some platform-independent logical operations of each of the plurality of platform-independent logical routines of the agricultural state machine may be executable by edge-based computing resources. For example, high-level flow of the agricultural state machine may be implemented as much as possible using edge-based computing resources. Other more computationally expensive logical operations may be allocated to cloud-based computing resources as needed or warranted.

In some implementations, logical operations of a given platform-independent logical routine may be dynamically allocated to a given edge computing resource using a set of platform-dependent parameters tailored specifically to the given edge computing resource. To this end, distinct sets of platform-dependent parameters may be available to map a platform-independent logical routine to multiple different heterogeneous edge computing resources. These platform-dependent parameters may include, for instance, a supported programming language, a processor architecture, and/or a number of available processing cores, to name a few. For example, a particular edge computing device may be equipped with one or more tensor processing units (TPUs). The set of platform-dependent parameters associated with that edge computing device may indicate the presence of these TPU(s). Accordingly, when heretofore platform-independent logical operations are allocated to the TPU-equipped edge computing device, those logical operations may be optimized, e.g., as a TPU-optimized algorithm.

FIG. 1 schematically illustrates one example environment in which one or more selected aspects of the present disclosure may be implemented, in accordance with various implementations. The example environment depicted in FIG. 1 relates to the agriculture domain, which as noted previously is a beneficial domain for implementing selected aspects of the present disclosure. However, this is not meant to be limiting. Techniques described here may be useful in any domain that would benefit from allowing experts and non-experts alike to be able to create machine learning state machines, and/or in which platform-independent state machines are distributed between edge-based and cloud-based computing resources. As one non-limiting example, scientists and researchers deployed in remote locations such as in space, in the Antarctic, in remote jungle regions, etc., may be experts in fields like physics, biology, chemistry, etc.

However, they may only have surface-level understanding of how machine learning works. With GUIs configured with selected aspects of the present disclosure, however, these scientists and researchers can create their own machine learning state machines, e.g., by dragging and dropping intuitively-labeled elements into a visual process flow. Moreover, the techniques described herein provide for dynamically allocating aspects of these machine-learning state machines between edge-based and cloud-based computing resources, freeing these non-experts from such technical details.

The environment of FIG. 1 includes a plurality of edge sites $102_{1-N}$ (e.g., farms, fields, plots, or other areas in which crops are grown) and a central agricultural inference system 104A. Additionally, one or more of the edge sites 102, including at least edge site $102_1$, includes edge-based computing resources. For example, edge side $102_1$ includes an edge agricultural inference system 104B, a plurality of client devices $106_{1-X}$, human-controlled and/or autonomous farm equipment $108_{1-M}$, and one or more fields 112 that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soybeans, corn, lettuce, spinach, beans, cherries, nuts, cereal grains, berries, grapes, and so forth.

One edge site $102_1$ is depicted in detail in FIG. 1 for illustrative purposes. However, as demonstrated by additional edge sites $102_{2-N}$, there may be any number of edge sites 102 corresponding to any number of farms, fields, or other areas in which crops are grown, and for which agricultural inferences such as crop yield predictions may be of interest. Each edge site 102 may include similar or different edge computing resources as those depicted in FIG. 1 as part of edge site $102_1$.

In various implementations, components of edge sites $102_{1-N}$ and central agricultural inference system 104A collectively form a distributed computing network in which edge nodes (e.g., client device 106, edge agricultural inference system 104B, farm equipment 108) are in network communication with central agricultural inference system 104A via one or more networks, such as one or more wide area networks ("WANs") 110A. Components within edge site $102_1$, by contrast, may be relatively close to each other (e.g., part of the same farm or plurality of fields in a general area), and may be in communication with each other via one or more local area networks ("LANs", e.g., Wi-Fi, Ethernet, various mesh networks) and/or personal area networks ("PANs", e.g., Bluetooth), indicated generally at 110B.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Central agricultural inference system 104A and edge agricultural inference system 104B (collectively referred to herein as "agricultural inference system 104") comprise an example of a distributed computing network for which techniques described herein may be particularly beneficial. Each of client devices 106, agricultural inference system 104, and/or farm equipment 108 may include one or more memories for storage of data and software applications, one or more processors for accessing data and executing applications, and other components that facilitate communication over a network. The computational operations performed by client device 106, farm equipment 108, and/or agricultural inference system 104 may be distributed across multiple computer systems.

Each client device 106 and some farm equipment 108 may operate a variety of different applications that may be used, for instance, to design platform-independent state machines and/or to obtain and/or analyze various agricultural inferences (real time and delayed) that were generated using techniques described herein. For example, a first client device $106_1$ operates integrated development environment (IDE) 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

Individual pieces of farm equipment $108_{1-M}$ may take various forms. Some farm equipment 108 may be operated at least partially autonomously, and may include, for instance, an unmanned aerial vehicle (UAV) $108_1$ that captures sensor data such as digital images from overhead field(s) 112. Other autonomous farm equipment (e.g., robots) may include a robot (not depicted) that is propelled along a wire, track, rail or other similar component that passes over and/or between crops, a wheeled robot $108_M$, or any other form of robot capable of being propelled or propelling itself past crops of interest. In some implementations, different autonomous farm equipment may have different roles, e.g., depending on their capabilities. For example, in some implementations, one or more robots may be designed to capture data, other robots may be designed to manipulate plants or perform physical agricultural tasks, and/or other robots may do both. Other farm equipment, such as a tractor $108_2$, may be autonomous, semi-autonomous, and/or human-driven. Any of farm equipment 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, barometers (for local weather information), photodiodes (e.g., for sunlight), thermometers, etc.

In some implementations, farm equipment 108 may take the form of one or more modular edge computing nodes $108_3$. An edge computing node $108_3$ may be a modular and/or portable data processing device and/or sensor package that, for instance, may be carried through an agricultural field 112, e.g., by being mounted on another piece of farm equipment (e.g., on a boom affixed to tractor $108_2$ or to a truck) that is driven through field 112 and/or by being carried by agricultural personnel. Edge computing node $108_3$ may include logic such as processor(s), application-specific integrated circuits (ASICs), field-programmable gate arrays (FPGA), etc., configured with selected aspects of the present disclosure to capture and/or process various types of sensor data to make agricultural inferences.

In some examples, one or more of the components depicted as part of edge agricultural inference system 104B may be implemented in whole or in part on a single edge computing node $108_3$, across multiple edge computing nodes $108_3$, and/or across other computing devices, such as client device(s) 106. Thus, when operations are described herein as being performed by/at edge agricultural inference system 104B, it should be understood that those operations may be performed by one or more modular edge computing nodes $108_3$, and/or may be performed by one or more other computing devices at the edge 102, such as on client device(s) 106 or other farm equipment 108.

In various implementations, edge agricultural inference system 104B may include a vision data module 114B, a sampling module 116, and an edge inference module 118B. Edge agricultural inference system 104B may also include one or more edge databases 120B for storing various data used by and/or generated by modules 114B, 116, and 118B, such as vision and/or other sensor data gathered by farm equipment $108_{1-M}$, agricultural inferences, machine learning models that are applied and/or trained using techniques described herein to generate agricultural inferences, and so forth. In some implementations one or more of modules 114B, 116, and/or 118B may be omitted, combined, and/or implemented in a component that is separate from edge agricultural inference system 104B.

Central agricultural inference system 104A is an example of cloud-based computing resources as it may be implemented across one or more computing systems that may be referred to as the "cloud." Central agricultural inference system 104A may receive massive sensor data generated by farm equipment $108_{1-M}$ (and/or farm equipment at other edge sites $102_{2-N}$) and process it using various techniques, including but not limited to application of machine learning state machines generated using techniques described herein, to make agricultural inferences.

However, the agricultural inferences generated by central agricultural inference system 104A may be delayed, e.g., by the time required to physically transport portable data devices (e.g., hard drives) from edge sites $102_{1-N}$ to central agricultural inference system 104A, and/or by the time required by central agricultural inference system 104A to computationally process this massive data. Growers at edge sites 102 may desire agricultural inferences much more quickly than this. Accordingly, in various implementations, selected aspects of platform-independent machine learning state machines built using GUIs configured with selected aspects of the present disclosure may be dynamically allocated to edge agricultural inference system 104B if possible/feasible, and to central agricultural central system 104A if necessary/beneficial.

In some implementations, sampling module 116 may be configured to sample, e.g., from one or more sensors onboard one or more farm equipment $108_{1-M}$, or from vision data provided by vision data module 114B, sensor data. Sampling module 116 may provide this sampled sensor data to edge inference module 118B. In some implementations, the sensor data may be applied, e.g., continuously and/or periodically by edge inference module 118B, as input across one or more machine learning models stored in edge database 120B to generate output indicative of one or more targeted plant traits detected in/on one or more plants in the agricultural field 112.

Edge agricultural inference system 104B may process the inference data at the edge using one or more of the machine learning models stored in database 120B, e.g., based on an agricultural state machine designed by a user using IDE 107. In some cases, one or more of these machine learning model(s) may be stored and/or applied directly on farm equipment 108, such as modular edge computing node $108_3$, to make a targeted inference about plants of the agricultural field 112.

In some implementations, edge agricultural inference system 104B may selectively (e.g., on an "as needed" basis) download and/or install trained models that are stored in database 120A of central agricultural inference system 104A. For example, if edge inference module 118B determines that a particular plant trait is detected, edge agricultural inference system 104B may download new machine learning model(s) that are trained to make inferences related to those detected plant traits. As one example, inference module 118B may apply a triage machine learning model to triage data to detect, generically, the presence of plant disease, without detecting which specific plant disease(s) are present. Then, inference module 118B may request and/or download, from central agricultural inference system 104A, one or more machine learning models that are trained to detect specific types of plant disease. Inference module 118B may then apply these newly-obtained model(s) to highly-detailed target inference data to determine which specific plant diseases are present. Then it is possible for agricultural personnel to practice more finely-targeted remedial measures.

As noted previously, various types of machine learning models may be applied by inference modules 118A/B to generate crop yield predictions (real time and delayed). Additionally, various types of machine learning models may be used to generate image embeddings that are applied as input across the various machine learning models. These various models may include, but are not limited to, RNNs, LSTM networks (including bidirectional), transformer networks, feed-forward neural networks, convolutional neural networks (CNNs), support vector machines, random forests, decision trees, etc.

Additionally, other data 124 may be applied as input across these models besides sensor data or embeddings generated therefrom. Other data 124 may include, but is not limited to, historical data, weather data (obtained from sources other than local weather sensors), data about chemicals and/or nutrients applied to crops and/or soil, pest data, crop cycle data, previous crop yields, farming techniques employed, and so forth. Weather data may be obtained from various sources other than sensor(s) of farm equipment 108, such as regional/county weather stations, etc. In implementations in which local weather and/or local weather sensors are not available, weather data may be extrapolated from other areas for which weather data is available, and which are known to experience similar weather patterns (e.g., from the next county, neighboring farms, neighboring fields, etc.).

In this specification, the term "database" and "index" will be used broadly to refer to any collection of data. The data of the database and/or the index does not need to be structured in any particular way and it can be stored on storage devices in one or more geographic locations. Thus, for example, database(s) 120A and 120B may include multiple collections of data, each of which may be organized and accessed differently.

Figure 2:
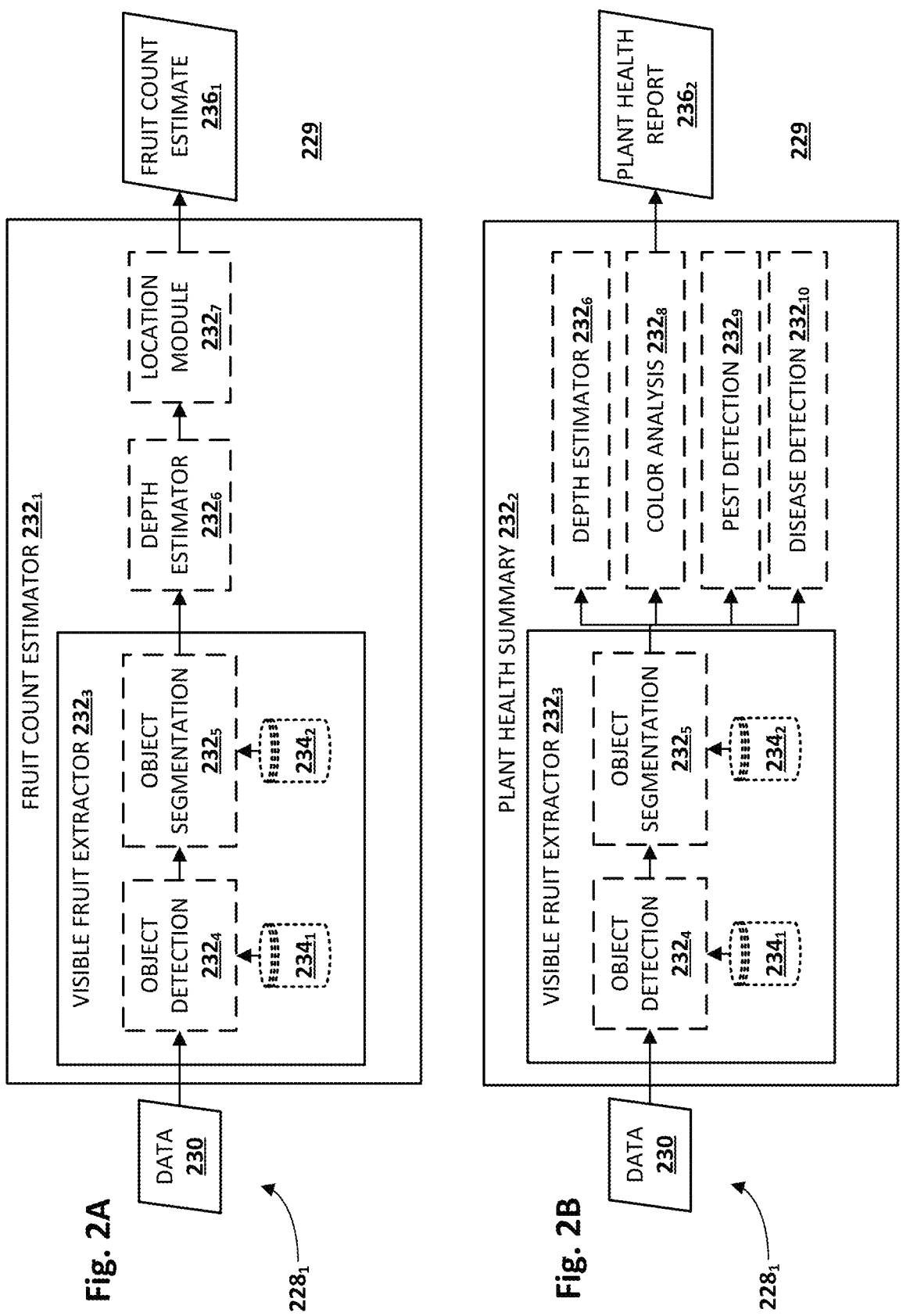
FIG. 2A and FIG. 2B schematically depict an example of how platform-independent state machines may be designed and represented graphically, in accordance with the present disclosure.

FIGS. 2A and 2B schematically depict an example of manipulable visual representations of ML state machines that may be presented to a user, e.g., on a working canvas 229 of a GUI of IDE 107. FIG. 2A depicts a first agricultural state machine $228_1$ and FIG. 2B depicts a second agricultural state machine $228_2$. FIGS. 2A and 2B demonstrate how relatively complex concepts such as machine learning may be encapsulated into intuitive, hierarchical elements such as a "Fruit Count Estimator" logical routine $232_1$ and a "Plant Health Summary" logical routine $232_2$ at a relatively high level, and/or a "Visible Fruit Exactor" logical routine $232_3$ at a lower level. In FIGS. 2A-B, data 230 may take the form of, for instance, vision data captured by a vision sensor that is carried through one or more fields. This vision data 230 may depict crops from various angles (e.g., overhead, from the side, etc.) and/or in various resolutions and/or wavelengths.

With first ML state machine $228_1$ in FIG. 2A, data 230 is first processed by Visible Fruit Extractor logical routine $232_3$, which itself includes an object detection logical routine $232_4$ and an object segmentation logical routine $232_5$. Object detection logical routine $232_4$ may utilize one or more machine learning models, such as a CNN $234_1$, to identify one or more objects, such as fruits, flowers, nuts, etc. These identifications may take various forms, such as bounding shape annotations. Object segmentation logical routine $232_5$ may be configured to segment objects, such as those contained in bounding boxes added by object detection logical routine $232_4$ to generate pixel-wise annotations. Object segmentation logical routine $232_5$ may or may not also rely on one or more machine learning models, such as another CNN $234_2$. Fruit Count Estimator logical routine $232_1$ at large may be designed to estimate a current count of fruit in a particular location, such as field 112. Accordingly, downstream of visible fruit extractor logical routine $232_3$ are a depth estimator logical routine $232_6$ and a location module logical routine $232_7$.

Depth estimator logical routine $232_6$ may be configured to analyze vision data 230 to estimate one or more distances (e.g., a distribution of distances) between one or more vision sensors and one or more aspects of crops and/or areas surrounding crops. For example, if the vision sensor captures crops from overhead, depth estimator logical routine $232_6$ may estimate depths to visible portions of crops and/or to the ground. From these depth estimations, depth estimator logical routine $232_6$ (or another, un-depicted logical routine) may, for instance, extrapolate total fruit counts for a plant based on a height of the plant (calculated using a difference between a distance to a top of the plant's canopy and the ground) and a count of visible fruits (e.g., those fruit that are visible from overhead, not occluded by leaves or other fruit) in one or more frames of vision data.

Location module logical routine $232_7$ may be configured to cluster fruit count estimates based on geographic locations. For example, fruit count estimates associated with individual frames of vision data 230 may be clustered based on geo-coordinates (e.g., GPS coordinates) associated with those frames. In this way, Fruit Count Estimator $232_1$ is able to generate a fruit count estimate $236_1$ for a particular geographic area, such as a field, a part of a field such as a row, etc.

Plant Health Summary logical routine $232_2$ operates on the same data 230 as Fruit Count Estimator logical routine $232_1$. Instead of estimating fruit counts, however, Plant Health Summary logical routine $232_2$ is configured to generate a plant health report $236_2$ that includes various pieces of data and/or inferences indicative of plant health. To this end, Plant Health Summary logical routine $232_2$ also includes a visible fruit extractor logical routine $232_3$, same as Fruit Count Estimator $232_1$. However, the downstream logical routines are different. Plant Health Summary logical routine $232_2$ provides input data for various logical routines, including depth estimator logical routine $232_6$, color analysis logical routine $232_8$, pest detection logical routine $232_9$, and disease detection logical routine $232_{10}$.

Depth estimator logical routine $232_6$ may perform a similar role as it performed in Fruit Count Estimator logical routine $232_1$, except that an aspect of its output, plant height, may be used as a measure of plant health. Color analysis logical routine $232_8$ may be configured to analyze colors of fruits that were detected by objection detection logical routine $232_4$ and segmented by object segmentation logical routine $232_5$. Additionally or alternatively, color analysis logical routine $232_8$ may be configured to analyze color of non-fruit parts of plants or their surroundings (e.g., pixels of vision data 230 not annotated as fruit), such as leaves, flowers, stems, underlying dirt, etc.

Pest detection logical routine $232_9$ may be configured to detect pest infestation (e.g., by detecting the pests and/or the damage they cause), e.g., on segmented fruit portions of vision data 230 or on portions (e.g., pixels) of vision data 230 not annotated as fruit. Pests or may include, for instance, various types of insects (e.g., aphids), snails and slugs, mammals such as deer, birds (which may damage or totally destroy fruit), and so forth. Disease detection logical routine $232_{10}$ may perform a similar role as pest detection logical routine $232_9$, except it may detect diseases (e.g., fungus, bacteria, viruses, etc.). In some implementations, one or both of pest detection logical routine $232_9$ and disease detection logical routine $232_{10}$ may utilize one or more machine learning models (not depicted) such as CNNs to detect pests and/or disease, although this is not required.

As noted previously, in various implementations, the working canvases 229 of FIGS. 2A and 2B may be usable to create, edit, manipulate, or otherwise act upon graphs (undirected or directed) that define ML state machines such as $228_{1-2}$. In some implementations, the graphical elements forming these graphs, including the nodes, may be drawn (e.g., dragged) from a library of available logical routines at various hierarchical levels. The elements in these libraries may be defined to be relatively intuitive, and may abstract out the underlying complexities of computer programming, machine learning, and/or data science from non-experts who may not understand it or be confused by it.

In FIGS. 2A and 2B, for instance, the node representing Fruit Count Estimator logical routine $232_1$ and the node representing Plant Health Summary logical routine $232_2$ may be two of several different nodes that are available to agricultural personnel. These various nodes may be used in isolation and/or logically coupled with each other using edges. In some implementations, nodes that are dependent on particular data being available may not be allowed to be logically coupled upstream from other nodes that make that particular data available. For example, without visible fruit extractor logical routine $232_3$, it may not be possible to use depth estimator logical routine $232_6$ and location module logical routine $232_7$ alone to define a state machine; such an attempt may result in the user receiving an error message.

Figure 3:
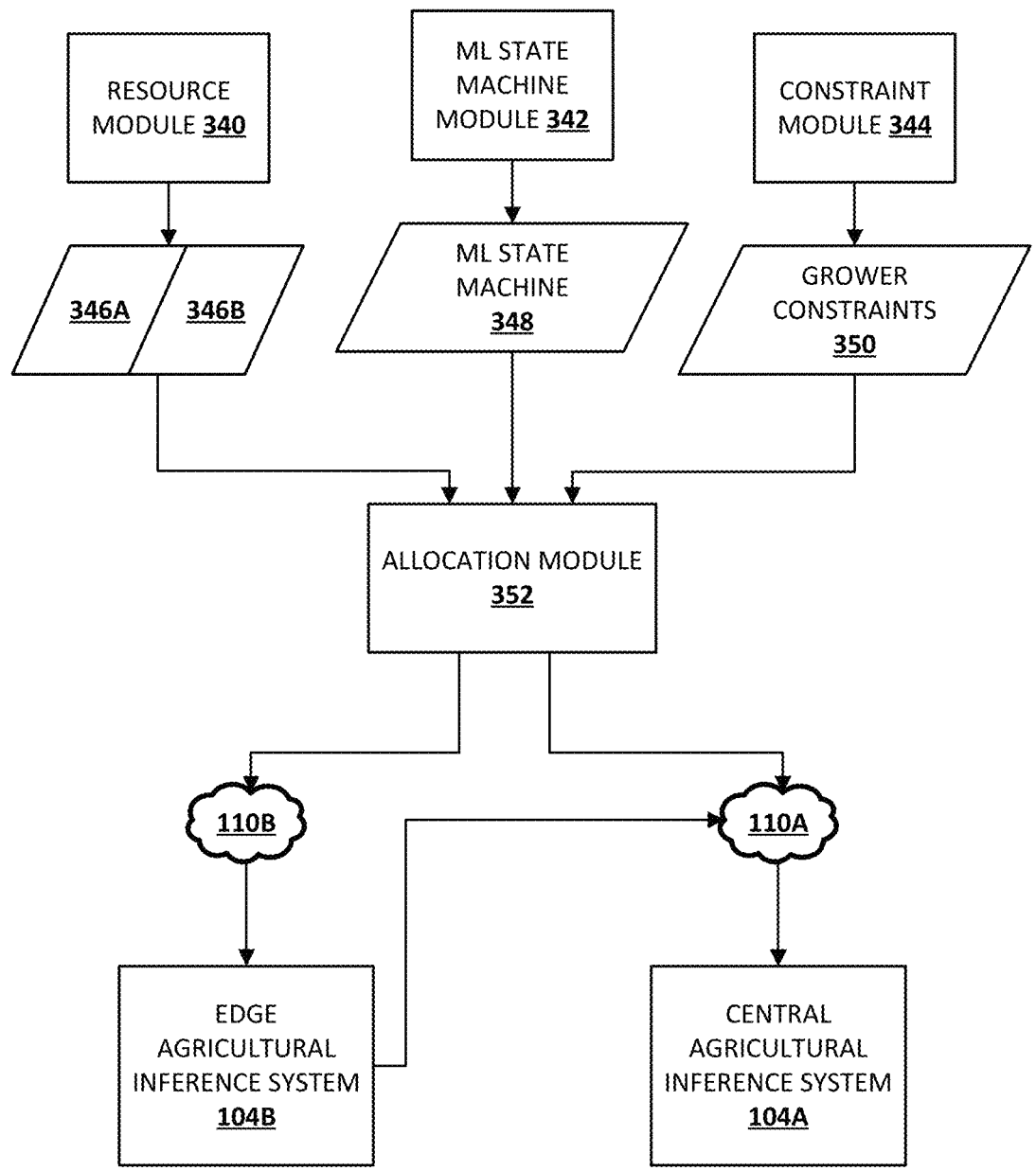
FIG. 3 schematically depicts an example of how various components may implement selected aspects of the present disclosure.

FIG. 3 schematically depicts an example of how various components may implement selected aspects of the present disclosure. A resource module 340, a machine learning ("ML" in FIG. 3) state machine module 342, a constraint module 344, and an allocation module 352 may be implemented using any combination of hardware or software, e.g., wholly or in part by edge agricultural inference system 104B.

Resource module 340 may be configured to ascertain edge computing resources information 346A and cloud-based computing resources information 346B; these information 346A/346B indicate what computing resources are available to a grower at the edge and at the cloud, respectively. Resource module 340 may ascertain this data in various ways. In some implementations, resource module 340 may ascertain edge computing resources information 346A by polling devices connected to LAN(s) 110B for information about network-connected computing nodes, including those nodes' capabilities, resource usage information (which may be used to determine, for instance, availability of the nodes' capabilities), and so forth. In some implementations, a grower may manually input edge computing resources information 346A.

Additionally or alternatively, in some implementations, a volunteer computing application (or "app") configured with selected aspects of the present disclosure may be installed on edge computing resources, such as client devices 106, modular edge computing nodes $108_3$, etc. Each instance of the volunteer computing application may provide information about unused computing resources (e.g., processor cycles, memory, network bandwidth, battery power) that are available locally on the node that hosts the volunteer computing application. By sharing this information with other instances of the volunteer computing application installed on other edge computing nodes, the multiple volunteer computing applications may cooperate to pool and/or donate unused edge computing resources for collective performance of edge computing operations, e.g., as an edge-based distributed computing environment. For example, a volunteer computing application may, periodically or in response to identifying unused computing resources, request jobs and/or report results of the jobs it performs. These jobs may include, for instance, whole logical routines or blocks of logical operations of agricultural state machines.

In some implementations, edge computing resources information 346A for a particular edge computing resource may include a set of platform-dependent parameters tailored specifically to that edge computing resource. More generally, multiple sets of distinct platform-dependent parameters may map any given platform-independent logical routine to a plurality of different edge computing resources. Separating platform-dependent parameters from machine learning state machines (348) in this way allows for the general flow of platform-independent machine learning state machines 348 to be separated from implementation and/or architecture-specific details. Consequently, it is possible to design platform-independent machine learning state machines 348 that are "portable," and hence can be reused, e.g., by different growers with different edge computing resources available to them, or by the same growers as their edge computing resources evolve over time.

Resource module 340 may ascertain cloud-based computing resources information 346B in various ways as well. In some cases, a grower may have the option of subscribing to different "tiers" of cloud-based services, with some tiers providing more cloud computing resources at a greater cost. Additionally or alternatively, a grower's access to cloud-based computing resources may be limited by factors such as geographic distance and/or network bandwidth; these data may also be ascertained by resource module 340.

In various implementations, ML state machine module 342 may facilitate rendition of the GUIs that enable growers to design and/or manipulate platform-independent agricultural state machines. Additionally or alternatively, ML state machine module 342 may store platform-independent machine-learning-based state machines 348 and make them available to other components as depicted in FIG. 3.

Constraint module 344 may be configured to ascertain, and provide to other components, grower constraints 350 that are imposed by growers. Grower constraints 350 may take various forms, such as desired measures of accuracy and/or latency thresholds, desired sample sizes for making inferences using machine learning state machines, etc. In some implementations, grower constraints 350 may be explicitly provided by growers, e.g., using a GUI such as that depicted in FIG. 4. Additionally or alternatively, in some implementations, grower constraints 350 may be inferred, e.g., based on observed conditions in a field (e.g., whether a disease may be detected), market conditions/fluctuations, types of crops grown (e.g., growing some types of crops successfully may require more or less accurate predictions/inferences than growing other types of crops), and so forth.

Allocation module 352 may be configured to analyze computing resource information 346A/346B, as well as a platform-independent machine learning-based state machine 348 and grower constraint(s) 350. Based on this analysis, allocation module 352 may dynamically allocate aspects of the platform-independent machine learning-based state machine 348 to edge agricultural inference system 104B via LAN(s) 110B and to central agricultural inference system 104A via WAN(s) 110A.

Allocation module 352 may perform this allocation in various ways. In some implementations, aspects of the platform-independent machine learning state machine that are assigned to a particular platform, whether the platform is edge-based or cloud-based, may be tailored to that assigned platform. In some implementations this may include compiling source code underlying the machine learning state machine into a form that is specific to the computing architecture of the assigned platform. In other implementations, this may include generating or providing portions of platform-independent code, such as bytecode, to the assigned platform. In some implementations, machine learning aspects of a platform-independent machine learning-based state machine 348 may include an array or matrix of weights, e.g., associated with a machine learning model such as a CNN. These platform-neutral weights may be passed to edge computing resources, which may have their own applications for applying those weights to data.

Figure 4:
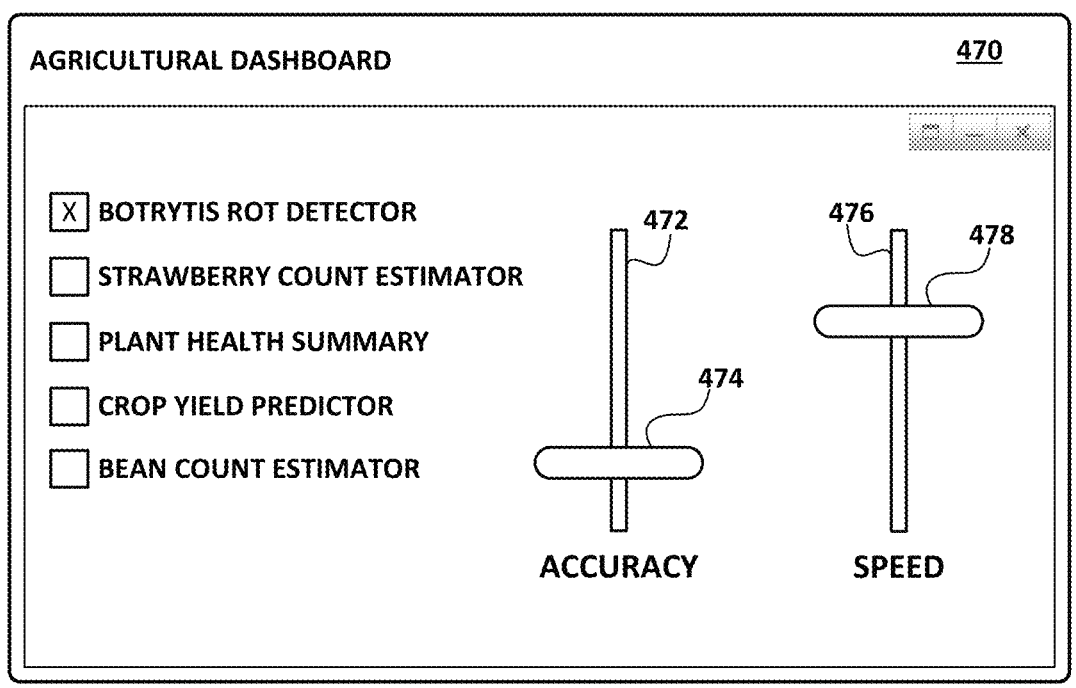
FIG. 4 depicts an example GUI for providing constraints on operation of a platform-independent machine learning state machine.

FIG. 4 depicts an example GUI 470 that may be presented by IDE 107 and operated, e.g., by a grower, in order to adjust and/or provide grower constraints 350. On the left, GUI 470 includes a number of selectable elements corresponding to a number of different platform-independent agricultural state machines: a botrytis rot detector, a strawberry count estimator, a plant health summary, a crop yield predictor, and a bean count estimator. A grower may select one or more of these elements in order to provide and/or adjust constraints that are specific to the selected elements. If multiple elements (and hence, multiple state machines) are selected, then consensus constraints between the multiple state machines may be adjusted.

In FIG. 4, the selectable element adjacent to the botrytis rot detector state machine is selected. On the right, a first slider 472 includes a first sliding element 474 that can be moved up or down to adjust a level of accuracy that is desired or required by a grower when detecting botrytis rot. A second slider 476 includes a second sliding element 478 that can be moved up or down to adjust a level of speed that is desired or required by the grower. The level of speed may in fact correspond to an acceptable measure of latency associated with the grower, but "speed" may be more intuitive to the grower than "latency."

In various implementations, there may be a tradeoff between accuracy and latency. Shorter latency may be achievable by implementing more of an agricultural state machine at the edge than at the cloud. However, due to constraints associated generally with edge computing resources, a machine learning model applied at the edge may have far less weights (or nodes, or neurons) than a machine learning model applied at the cloud, and therefore may generate less accurate inferences. However, the tradeoff of decreased latency may be worth it to the grower, especially if the less accurate inferences are "good enough" to take remedial action or to quickly confirm the findings.

Given these tradeoffs, in various implementations, adjustment of one of the sliders 472, 476 may impact a value and/or range of the other slider 476, 478. For example, if the first sliding element 474 is moved down first slider 472 to indicate that a grower only requires a low measure of accuracy, the second sliding element 478 may automatically move up the second slider 476 to a position that corresponds to a newly-reachable latency. Additionally or alternatively, a range of available latencies represented by second slider 476 may increase, giving the grower more flexibility for selecting a desired speed.

Likewise, moving the second sliding element 478 down, which may indicate that the grower needs less speed (and hence, is tolerant of greater latency), may automatically move the first sliding element 474 upwards on first slider 472 to indicate a greater measure of accuracy. Alternatively, the range represented by first slider 472 may increase to reflect greater levels of accuracy that are now achievable, given the grower's flexibility with regard to speed.

Figure 5:
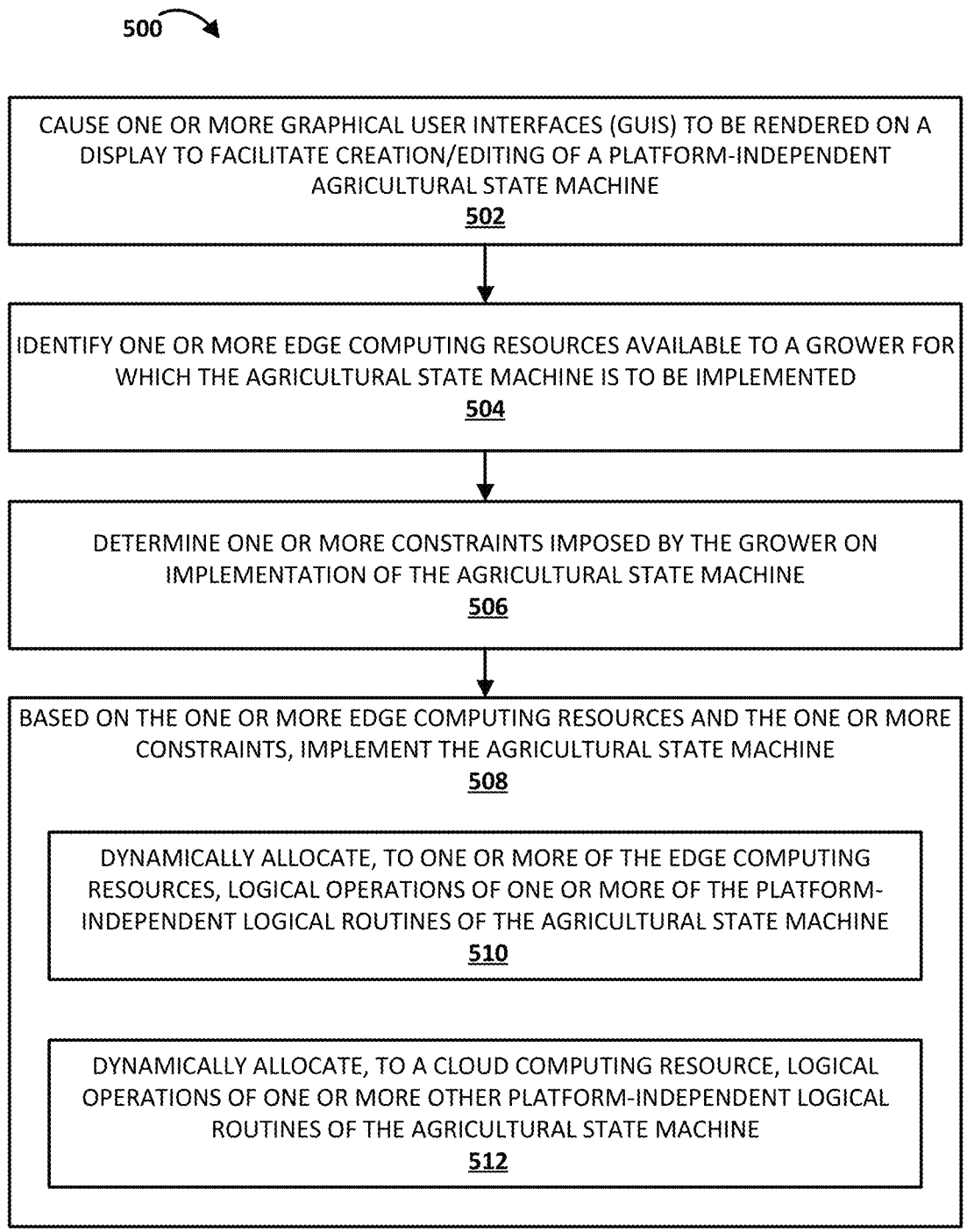
FIG. 5 is a flowchart of an example method in accordance with various implementations described herein.

FIG. 5 illustrates a flowchart of an example method 500 for practicing selected aspects of the present disclosure. For convenience, operations of method 500 will be described as being performed by a system configured with selected aspects of the present disclosure. Other implementations may include additional operations than those illustrated in FIG. 5, may perform operation(s) of FIG. 5 in a different order and/or in parallel, and/or may omit one or more of the operations of FIG. 5.

At block 502, the system may cause one or more GUIs to be rendered on a display of a client device 106, e.g., as part of IDE 107. Each GUI of the one or more GUIs may include a working canvas 229 on which a plurality of graphical elements (e.g., 230, $232_{1-10}$, $234_{1-2}$, $236_{1-2}$ in FIGS. 2A-B) corresponding to a plurality of platform-independent logical routines are manipulable to define a platform-independent agricultural state machine (e.g., $228_1$, $228_2$). One or more of the platform-independent logical routines may include logical operations that process agricultural data that represents one or more plants using one or more phenotyping machine learning models, such as $234_{1-2}$.

At block 504, the system, e.g., by way of resource module 340, may identify one or more edge computing resources available to a grower for which the agricultural state machine is to be implemented. At block 506, the system, e.g., by way of constraint module 344, may determine one or more constraints imposed by the grower on implementation of the agricultural state machine.

Based on the one or more edge computing resources determined at block 504 and the one or more constraints determined at block 506, at block 508, the system may implement the agricultural state machine. In various implementations, the implementation of block 508 may include, at block 510, dynamically allocating, to one or more of the edge computing resources, logical operations of one or more of the platform-independent logical routines of the agricultural state machine. Additionally, the implementation of block 508 may include, at block 512, dynamically allocating, to a cloud computing resource in network communication with the one or more edge computing resources, logical operations of one or more other platform-independent logical routines of the agricultural state machine.

Figure 6:
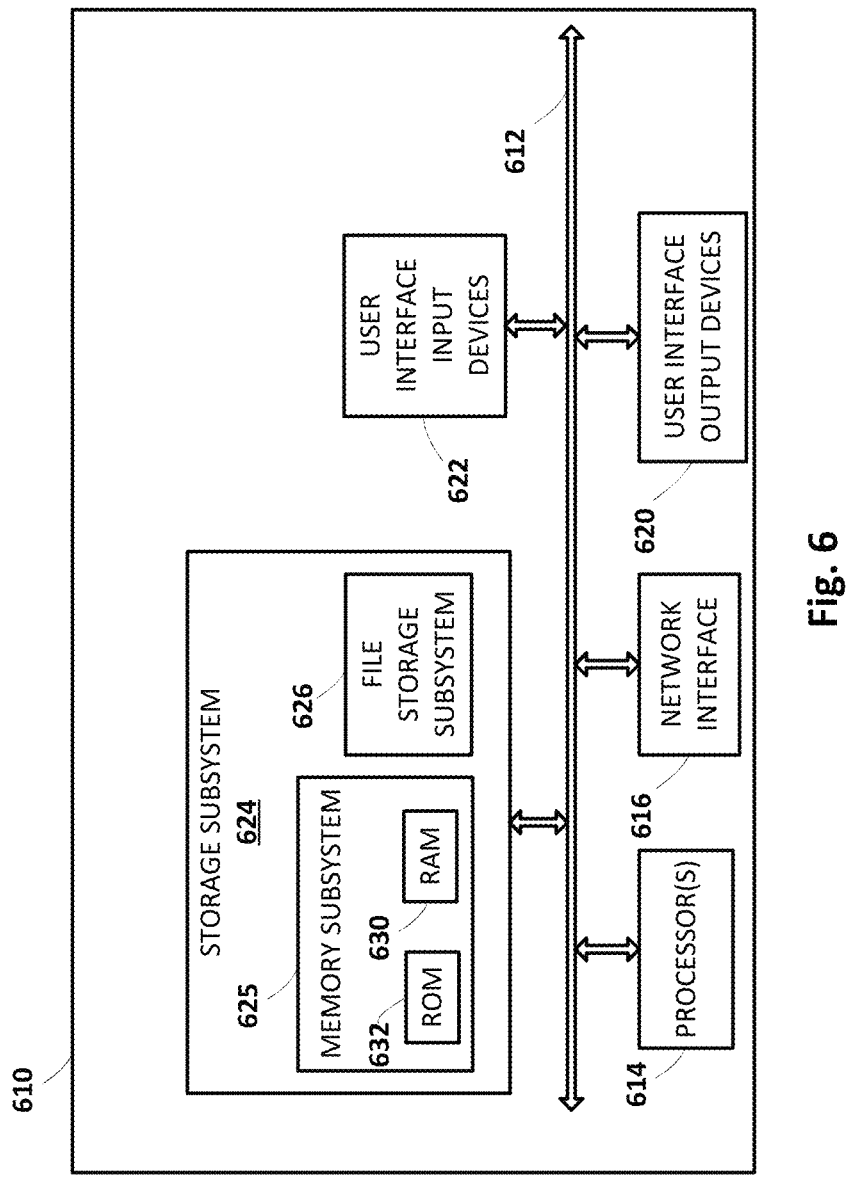
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method 500 described herein, as well as to implement various components depicted in FIGS. 1-3.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
  causing one or more graphical user interfaces (GUIs) to be rendered on a display, wherein each GUI of the one or more GUIs includes a working canvas that is usable to create, edit, manipulate, or otherwise act upon a plurality of graphical nodes corresponding to a plurality of platform-independent logical routines, wherein the plurality of graphical nodes are movable on the working canvas relative to each other to connect an output of at least one of the graphical nodes to an input of another of the graphical nodes via one or more edges to define a platform independent agricultural state machine, and wherein one or more of the platform independent logical routines includes logical operations that process agricultural data that represents one or more plants using one or more phenotyping machine learning models;
  identifying one or more edge computing resources available to a user for which the agricultural state machine is to be implemented;

determining one or more constraints imposed by the user on implementation of the agricultural state machine, wherein the one or more constraints include one or more latency thresholds for obtaining phenotypic predictions about plants generated based on processing images of the plants using one or more of the platform-independent logical routines; and based on the one or more edge computing resources and the one or more constraints,
- dynamically allocating, to one or more of the edge computing resources, logical operations of one or more of the platform-independent logical routines of the agricultural state machine that will satisfy the one or more constraints when executed on one or more of the edge computing resources; and
- dynamically allocating, to a cloud computing resource in network communication with the one or more edge computing resources, logical operations of one or more other platform-independent logical routines of the agricultural state machine that will not satisfy the one or more constraints when executed on one or more of the edge computing resources.

2. The method of claim 1, wherein the one or more constraints include a desired measure of accuracy of the phenotypic predictions about the plants generated based on processing images of the plants using one or more of the phenotyping machine learning models.

3. The method of claim 1, comprising causing one or more of the edge computing resources to execute at least some platform-independent logical operations of each of the plurality of platform-independent logical routines of the agricultural state machine.

4. The method of claim 1, wherein the logical operations of one or more of the platform-independent logical routines are dynamically allocated to one or more of the edge computing resources in response to detection of a phenotypic trait of one or more of the plants.

5. The method of claim 1, wherein the logical operations of one or more of the platform-independent logical routines are dynamically allocated to one or more of the edge computing resources in response to detection of a plant disease or pest affecting one or more of the plants.

6. The method of claim 1, wherein logical operations of a given platform-independent logical routine are dynamically allocated to a given edge computing resource using a set of platform-dependent parameters tailored specifically to the given edge computing resource, wherein a plurality of sets of distinct platform dependent parameters map the given platform-independent logical routine to a plurality of different edge computing resources.

7. The method of claim 6, wherein the set of platform-dependent parameters include one or more of:
- a programming language supported by the given edge computing resource;
- a processor architecture of the given edge computing resource; or
- a number of processing cores available on the given edge computing resource.

8. A system comprising one or more processors and memory storing instructions that, in response to execution of the instructions, cause the one or more processors to:
cause one or more graphical user interfaces (GUIs) to be rendered on a display, wherein each GUI of the one or more GUIs includes a working canvas that is usable to create, edit, manipulate, or otherwise act upon a plurality of graphical nodes corresponding to a plurality of platform-independent logical routines, wherein the plurality of graphical nodes are movable on the working canvas relative to each other to connect an output of at least one of the graphical nodes to an input of another of the graphical nodes via one or more edges to define a platform-independent agricultural state machine, and wherein one or more of the platform-independent logical routines includes logical operations that process agricultural data that represents one or more plants using one or more phenotyping machine learning models;

identify one or more edge computing resources available to a user for which the agricultural state machine is to be implemented;

determine one or more constraints imposed by the user on implementation of the agricultural state machine, wherein the one or more constraints include one or more latency thresholds for obtaining phenotypic predictions about plants generated based on processing images of the plants using one or more of the platform-independent logical routines; and based on the one or more edge computing resources and the one or more constraints,
- dynamically allocate, to one or more of the edge computing resources, logical operations of one or more of the platform-independent logical routines of the agricultural state machine that will satisfy the one or more constraints when executed on one or more of the edge computing resources; and
- dynamically allocate, to a cloud computing resource in network communication with the one or more edge computing resources, logical operations of one or more other platform-independent logical routines of the agricultural state machine that will not satisfy the one or more constraints when executed on one or more of the edge computing resources.

9. The system of claim 8, wherein the one or more constraints include a desired measure of accuracy of the phenotypic predictions about the plants generated based on processing images of the plants using one or more of the phenotyping machine learning models.

10. The system of claim 8, comprising instructions to cause one or more of the edge computing resources to execute at least some platform-independent logical operations of each of the plurality of platform-independent logical routines of the agricultural state machine.

11. The system of claim 8, wherein the logical operations of one or more of the platform-independent logical routines are dynamically allocated to one or more of the edge computing resources in response to detection of a phenotypic trait of one or more of the plants.

12. The system of claim 8, wherein the logical operations of one or more of the platform-independent logical routines are dynamically allocated to one or more of the edge computing resources in response to detection of a plant disease or pest affecting one or more of the plants.

13. The system of claim 8, wherein logical operations of a given platform-independent logical routine are dynamically allocated to a given edge computing resource using a set of platform-dependent parameters tailored specifically to the given edge computing resource, wherein a plurality of sets of distinct platform dependent parameters map the given platform-independent logical routine to a plurality of different edge computing resources.

14. The system of claim 13, wherein the set of platform-dependent parameters include one or more of:
- a programming language supported by the given edge computing resource;

a processor architecture of the given edge computing resource; or a number of processing cores available on the given edge computing resource.

15. A non-transitory computer-readable medium comprising instructions that, in response to execution of the instructions by a processor, cause the processor to:

cause one or more graphical user interfaces (GUIs) to be rendered on a display, wherein each GUI of the one or more GUIs includes a working canvas that is usable to create, edit, manipulate, or otherwise act upon a plurality of graphical nodes corresponding to a plurality of platform-independent logical routines, wherein the plurality of graphical nodes are movable on the working canvas relative to each other to connect an output of at least one of the graphical nodes to an input of another of the graphical nodes via one or more edges to define a platform-independent agricultural state machine, and wherein one or more of the platform-independent logical routines includes logical operations that process agricultural data that represents one or more plants using one or more phenotyping machine learning models;

identify one or more edge computing resources available to a user for which the agricultural state machine is to be implemented;

determine one or more constraints imposed by the user on implementation of the agricultural state machine, wherein the one or more constraints include one or more latency thresholds for obtaining phenotypic predictions about plants generated based on processing images of the plants using one or more of the platform-independent logical routines; and based on the one or more edge computing resources and the one or more constraints, dynamically allocate, to one or more of the edge computing resources, logical operations of one or more of the platform-independent logical routines of the agricultural state machine that will satisfy the one or more constraints when executed on one or more of the edge computing resources; and dynamically allocate, to a cloud computing resource in network communication with the one or more edge computing resources, logical operations of one or more other platform-independent logical routines of the agricultural state machine that will not satisfy the one or more constraints when executed on one or more of the edge computing resources.

16. The non-transitory computer-readable medium of claim 15, wherein the one or more constraints include a desired measure of accuracy of the phenotypic predictions about the plants generated based on processing images of the plants using one or more of the phenotyping machine learning models.

17. The non-transitory computer-readable medium of claim 15, comprising instructions to cause one or more of the edge computing resources to execute at least some platform-independent logical operations of each of the plurality of platform-independent logical routines of the agricultural state machine.

* * * * *